(12) United States Patent
Peled et al.

(10) Patent No.: US 6,203,947 B1
(45) Date of Patent: Mar. 20, 2001

(54) LONG CYCLE-LIFE ALKALI METAL BATTERY

(75) Inventors: Emanuel Peled, Even Yehuda; Diana Golodnitsky, Rishon LeZion; Ela Strauss, Bat Yam, all of (IL)

(73) Assignee: Ramot University Authority for Applied Research and Industrial Development Ltd., Ramat Aviv (IL)

( * ) Notice: Subject to any disclaimer, the term of this patent is extended or adjusted under 35 U.S.C. 154(b) by 0 days.

(21) Appl. No.: 09/280,646

(22) Filed: Mar. 29, 1999

(30) Foreign Application Priority Data

Apr. 8, 1998 (IL) ............................................ 124007

(51) Int. Cl.$^7$ .................................................... H01M 4/58
(52) U.S. Cl. ................ 429/231.95; 429/231.9; 429/231.5; 429/221; 429/304; 429/309; 429/322; 429/324; 429/325; 429/320
(58) Field of Search ................ 429/231.95, 231.5, 429/231.9, 221, 322, 324, 325, 320, 309, 304, 231.3

(56) References Cited

U.S. PATENT DOCUMENTS

| | | |
|---|---|---|
| 4,224,394 | 9/1980 | Schmidt . |
| 4,298,668 | 11/1981 | Schmidt et al. . |
| 5,472,808 | * 12/1995 | Peled et al. ........................... 429/192 |
| 5,552,238 | * 9/1996 | Carlin et al. ............................ 429/50 |

OTHER PUBLICATIONS

Peled et al., "Film forming reaction at the lithium/electrolyte interface," Journal of Power Sources, 9, pp. 253–266, 1983.*
Peled et al., "Film Forming Reaction at the Lithium/Electrolyte Interface," Journal of Power Sources, 9 (1983)253–266.
Peled et al., "Advanced Model for Solid Electrolyte Interphase Electrodes in Liquid and Polymer Electrolytes," J. Electrochem, Soc., vol. 144, No. 8, Aug. 1997.
Strauss et al., "Cathode Modification for Improved Performance of Rechargeable Lithium/Composite Polymer Electrolyte–Pyrite Battery," Electrochemical and Solid–State Letters, 2(3)115–117 (1999).

* cited by examiner

*Primary Examiner*—Carol Chaney
*Assistant Examiner*—Angela J. Martin
(74) *Attorney, Agent, or Firm*—Browdy and Neimark

(57) ABSTRACT

The present invention provides a cathode for use in a secondary electrochemical cell, such cathode being coated with a very thin, protective film, permeable to ions. The protective film of the cathode usually has a thickness of up to about 0.1 μm and it provides protection against high voltage charging and overdischarging. The present invention further provides a secondary electrochemical cell comprising such a cathode.

21 Claims, 9 Drawing Sheets

LONG CYCLE-LIFE ALKALI METAL BATTERY

FIELD OF THE INVENTION

This invention relates to electrochemical cells, especially to rechargeable cells, having an anode consisting of an alkali metal or alkali metal alloy, particularly a lithium anode. The invention also relates to cathodes for use in such electrochemical cells.

BACKGROUND OF THE INVENTION

Recently, with the increased awareness of air pollution and global warming, the development of electric vehicles has gained considerable interest, thus leading to a need for improvements in the performance of secondary batteries. Of specific interest are batteries, which can be minaturized, have a high energy density and which demonstrate a long cycle life.

Non-aqueous electrolyte batteries containing anodes composed of alkali metals such as lithium are an example of known batteries that meet these criteria. Lithium batteries have recently undergone remarkable developments in terms of performance improvement and miniaturization. These developments have required improvements with respect to the material and shape of the anodes and cathodes, and also with respect to the intervening electrolyte.

For example, the thin film design of a Li/composite polymer electrolyte/pyrite ($FeS_2$) battery offers low manufacture cost, high power and improved safety, as a result of the use of non-aqueous or polymer electrolytes. The Applicant' U.S. Pat. No. 5,472,808 describes a composite solid electrolyte (CSE) for use in rechargeable electrochemical cells such as lithium batteries and also relates to cells that contain such solid electrolytes. These cells, however, suffer from two main drawbacks: slow charge rate and short cycle life.

The lithiated forms of the transition metal chalcogenides, such as: $TiS_2$, $MoS_2$, $MnO_2$, $NiO_2$, $MoO_3$, $V_2O_5$, $V_8O_{13}$ are commonly used as ca active materials in high energy density lithium, rechargeable batteries.

However the cycle life and safety of these batteries, are insufficient.

One of the main reasons for the decreased reversibility of these lithium batteries is non-compatibility of the cathode active material with the non-aqueous or polymer electrolytes. This non-compatibility is more pronounced in fully charged or fully discharged batteries. The final product of fully reduced cathode material is atomic metal, usually in the form of small aggregates having a large surface area, which are excessively reactive and, therefore, highly susceptible to attack by the electrolyte components causing the electrolyte decomposition and the formation of undesirable products.

OBJECTS OF THE INVENTION

It is an object of the present invention to provide an alkali metal secondary electrochemical cell with a long cycle life and a fast charge rate. A more particular object of the invention is to provide a rechargeable lithium battery exhibiting superior cell performance as compared to such cell systems known in the art.

SUMMARY OF THE INVENTION

The above objects are achieved by the present invention, which provides a cathode for use in a secondary electrochemical cell, comprising up to about 95 volume-% of electrochemically active material, characterized in that the cathode is coated, after being assembled, by a thin, ion-permeable, electronically non-conductive protective film. The protective film of the cathode of the present invention usually has a thickness of up to about 0.1 $\mu$m.

The preferred electrochemically active materials of the cathode are $LiCoO_2$, $LiNiO_2$, $LiMn_2O_4$, $FeS_2$, $TiS_2$, $V_2O_5$ or $V_8O_{13}$, which may be doped with up to about 10% by weight of a metal selected from Mg, Ca, Ni, Co, Al, B, Fe, Mn, or a compound of such metal.

The present invention is based on the new finding that modifing the cathode by coating it with a very thin, protective film, permeable to ions but not to electrons, provides protection against high voltage charging and overdischarging, thereby reducing the degradation of the cathode during cycling and improving the performance characteristics of the battery. This coating is preferably formed electrochernically by over-discharge of the cell, usually at the end of the fHt discharge.

The invention further relates to secondary electrochemical cells comprising a cathode as above defined, an anode which consists of an alkali metal or alkali metal alloy, preferably lithium, and a solid electrolyte. The preferred electrolytes for these cells are non-aqueous aprotic solutions, preferably containing mixtures of alkyl carbonates or polymer electrolytes, more preferably based on polyethylene oxide.

BRIEF DESCRIPTION OF THE DRAWINGS

The present invention will be described with reference to the accompanying drawings of which.

DETAILED DESCRIPTION OF THE INVENTION

Figure 1:
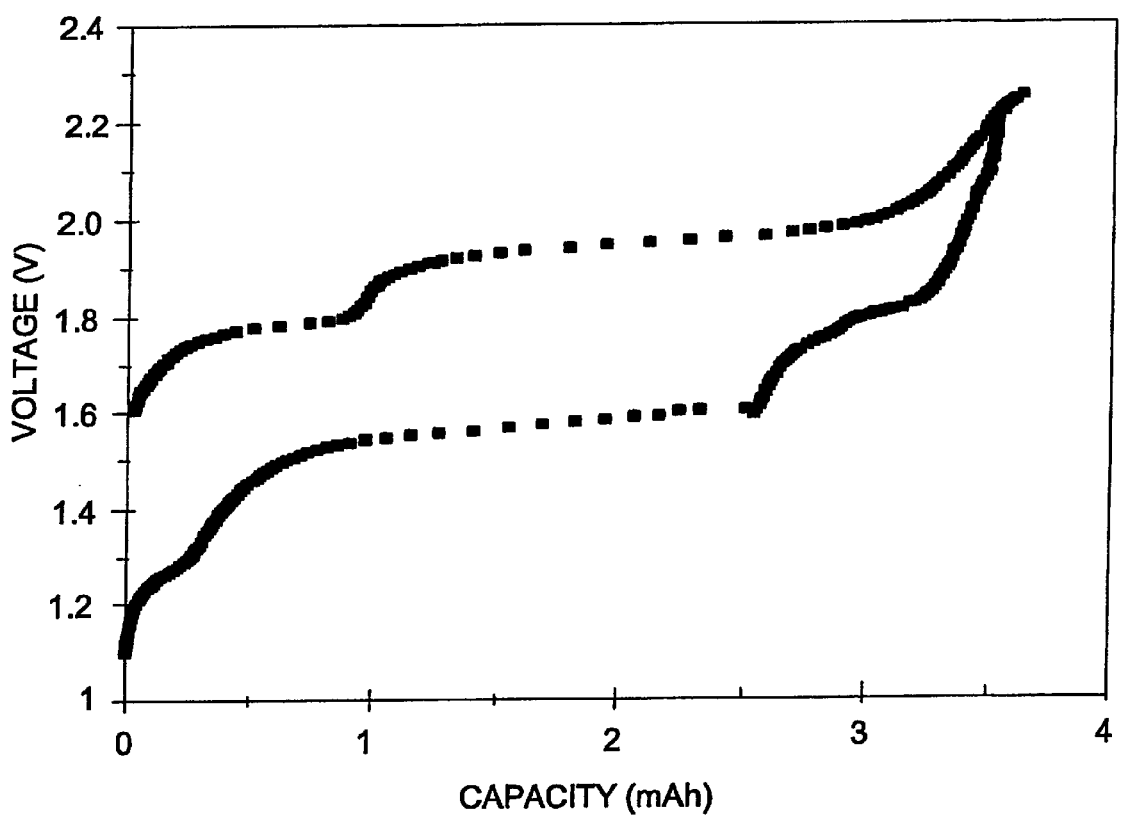
FIG. 1 is a graph showing charge-discharge curves of a Li/CPE/$FeS_2$ cell at cycle 2, with an uncoated cathode.

The Li/composite polymer electrolyte (CPE)/$FeS_2$ battery has a high theoretical energy density (about 1270 Wh/kg based on 4e/$FeS_2$) and it is made of cheap, non-toxic materials. During the second discharge of a Li/CPE/$FeS_2$ cell, an additional low-voltage step, non-typical for the electrochemical behavior of pyrite, was found at about 1.3V (FIG. 1). This capacity fading is associated with the formation of a new phase, probably due to the reaction of metallic iron with the electrolyte. In addition it was found that the degree of cathode degradation dramatically increases when rechargeable lithium batteries are charged or stored at elevated temperatures, indicating the acceleration of the reaction between charged cathodes and electrolytes.

The present invention is based on the new finding that the proposed reaction between the iron particles and the electrolyte may be overcome by coating the cathode with a very thin ion-conductive protective film. This film provides protection to the cathode active material in fully charged and/or fully discharged states and improves the performance characteristics of the battery, Protective films are usually formed in electrochemical cells on the surface of anodes of primary and secondary batteries and are called in the art solid electrolyte interphases -SEI (F. Peled, J. of Power Sources 9, 253–266, 1983).

According to the present invention, the SEI on cathodes is formed electrochemically typically at the end of the first discharge by deep discharge of the cell. A reliable cathode SEI must have the following properties:

1) $t_e=0$, i.e. acts as an electronic resistor in order to avoid self discharge and low faradaic efficiency ($\in_f$) ($t_e$—electron transport number);
2) $t_i=1$, to eliminate concentration polarization ($t_i$—ionic transport number; for a cell with allai metal anode $t_i=t_+$);
3) high ionic conductivity to reduce overvoltage;
4) uniform morphology and chemical composition for homogeneous current distribution;
5) good adhesion to the cathode particles;
6) mechanical strength and flexibility.

According to the present invention, the electrolyte is designed so as to contain at least one material that can be reduced to form an insoluble SEI on the cathode surface. Aprotic solvents such as ethylene carbonate (EC), diethyl-carbonate (DEC), dimethylcarbonate (DMC), ethyl methyl carbonate (EMC), butyl carbonate, propylene carbonate, vinyl carbonate, diallylsulfites and any mixtures of these, and metal salts such as $LiPF_6$, $LiBF_4$, $LiAsF_6$, $LiCF_3SO_3$, LiI, LiBr and $LiN(CF_3SO_2)_2$ are considered to be good SEI precursors. The electrolyte may further contain a polymer electrolyte or composite polymer electrolyte, preferably polyethylene oxide, adapted to form a complex with the metal salt.

While lithium metal foil is typically used for the negative electrode, the negative electrode is not specifically restricted as long as it comprises an electrically conductive sheet that provides alkali metal in a form effective for the electrode reaction. The negative electrode may also be exemplified by lithium/aluminum alloy or lithium intercalated in a carbon sheet.

Similarly, the active substance of the positive electrode is not specifically restricted as long as it is of a type in which the metal ions, e.g. lithium ions are intercalated or inserted during discharge and de-intercalated during charge of the secondary battery. Inorganic compounds may typically be employed, for example $LiCoO_2$, $LiNiO_2$, $LiMn_2O_4$, $FeS_2$, $TiS_2$, $V_2O_5$, $V_8O_{13}$ and the like. As these compounds are typically brittle, they may be formulated as a sheet through the use of an organic resin binder. The effect of binders, such as polyvinilidene fluoride (PVDF), polybutadiene (PBD), polystyrene, polycarbonate resin on the performance and cycle life of thin $FeS_2$-based cathodes was studied. It was found, that the total active material utilization (100%) was achieved in polyethylene oxide and PVDF-binded cathodes. It was found that the utilization of a polystyrene-containing pyrite composite cathode was 5 times as great as a polybutadien one. At low discharge current density (id=50 $\mu A/cm^2$) reversible 2.5–2.8 Li/Fe ratio was achieved.

In addition, it was found that where a polymer electrolyte and/or a cathode contain up to 20% of inorganic filler, such as nanosize powders of $Al_2O_3$, $SiO_2$, MgO, $TiO_2$, $ZrO_2$ or their mixtures, the whole cell demonstrates improved charge-discharge characteristics. For example, a secondary electrochemical $Li/CPE/FeS_2$ battery with optimized 12 $\mu m$-thick pyrite composite cathode was tested. The composite cathode contained: 40% (v/v) pyrite and 60% (v/v) of $LiI_1 P(E)_{20} EC_1$ composite polymer electrolyte containing 40% v/v $Al_2O_3$. A reversible Li/Fe ratio of about 2.3 (at C/1.5 rate) was obtained for an optimized pyrite composite cathode. The anticipated specific energy of the battery employing this cathode is 130 Wh/kg (at C/1.5 rate) and its projected continuous specific power is about 300 W/kg based 5 $mA/cm^2$ discharge tests. This thin-cathode battery is capable of delivering 0.1 $A/cm^2$ pulses that are equivalent to a specific power of 3 kW/kg.

The preferred current collector for the composite $FeS_2$ cathode is a carbon or graphite sheet or a composite of carbon or graphite coated nickel, aluminum, copper or stainless steel foils. Carbon coating can be done by, for example, chemical vapor deposition or sputtering.

The cathode SEI coating in a lithium battery is typically composed of $Li_2O$, $Li_2CO_3$, LiF and polymers. These are products of electrolyte decomposition according to electrochemical reactions, such as:

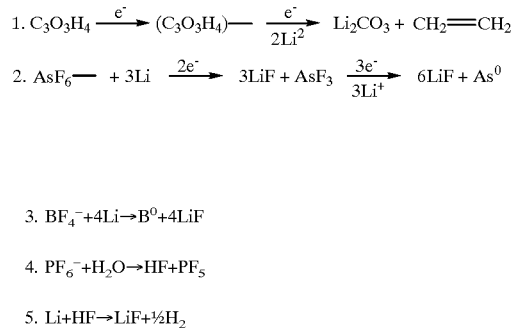

The voltage at which the SEI is formed ($V_{SEI}$) depends on temperature, concentration and types of solvents, salts and impurities, on the current density, the type of the cathode-active material and on the surface properties of the cathode particles. For lithium battery electrolytes, $V_{SEI}$ on catode is in the range of 0.3 to 1.0 V vs Li reference electrode (RE), but it continues to form down to 0 V. In some cases the completion of SEI formation may take several charge-discharge cycles. In the case of reactive components like $AsF_6^-$, $CO_2$ and ethylene carbonate (EC), $V_{SEI}$ moves to more positive values. However for more kinetically stable substances like $ClO_4^-$ (and probably $PF_6^-$ and imide), $V_{SEI}$ approaches the $Li/Li^+$ potential, i.e. the overpotential of the SEI formation process is higher.

The formation of SEI on pyrite-based composite cathode was camed out under several operating conditions. The experimental results are presented in Table 1 and in FIGS. 2 and 3.

TABLE 1

| Cell code | No. of cycles | Capacity loss, [%/cycle] | Appearance of the 1.3 V potential step at cycle # | Current density of the SEI formation [mA/cm$^2$] |
|---|---|---|---|---|
| E30[a] | 20 | 1.75 | 2 | — |
| E20[a] | 102 | 0.62 | 2 | — |
| E72 | 291 | 0.19 | 5 | 0.05 |
| E76 | | | 11 | 0.5 |
| S2[b] | 426 | 0.113 | 4 | 0.05 (1$^{st}$) |
| S4 | 250 | 0.23 | 4 | 0.05 |
| S3[b] | 394 | 0.125 | 3 | 0.2 (1$^{st}$) |
| | | | | 0.2 (2$^{nd}$) |
| SD10[c] | 29 | 0.52 | 3 | 0.5 |
| SD11[c] | 56 | 0.33 | 3 | 0.5 |
| SD12[c] | 56 | 0.61 | 3 | 0.5 |

[a]-reference cell without cathode SEI; [b]-SEI was built twice, in the 1st cycle and in the 5th cycle; [c]-charge current density is 0.5 mA/cm2. In other cases charge current density is 0.05 mA/cm$^2$.

Figure 2:
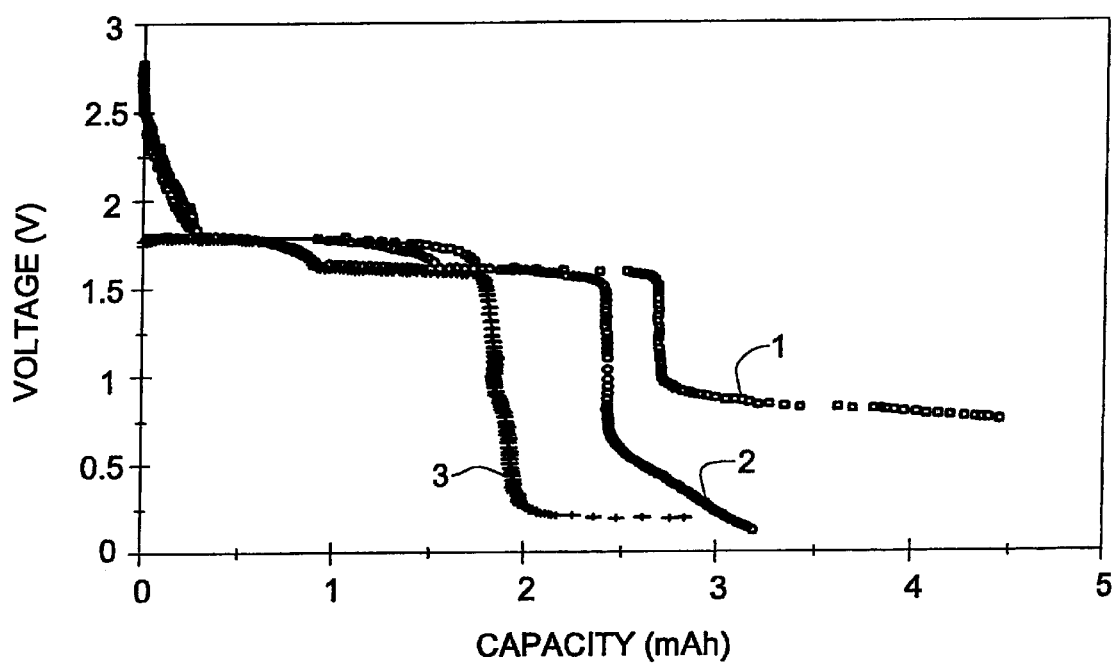
FIG. 2 is a graph showing first discharge curves of a Li/CPE/$FeS_2$ cell at 135° C., obtained during various operation conditions.
Figure 3:
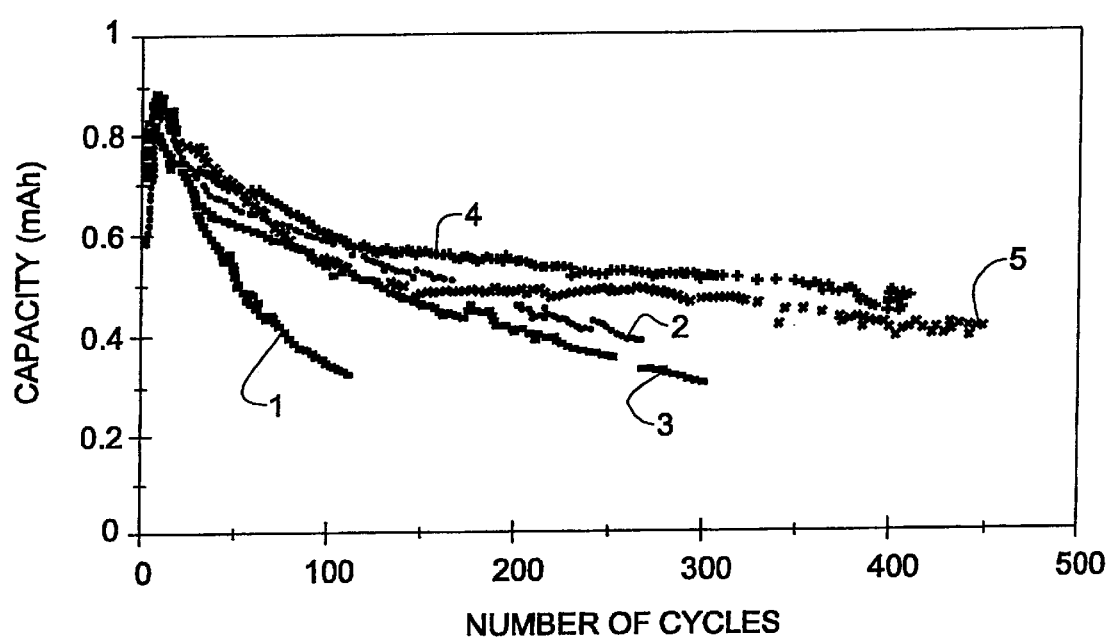
FIG. 3 is a graph showing the discharge capacity (at 30050$\mu$A/cm$^2$) of a Li/CPE/$FeS_2$ cell vs. number of cycles at 135 C. The Operation conditions of SEI formation are: 1. Without SEI. 2. id=50$\mu$A/cm$^2$, Vcutoff=0.76; 3. id=50$\mu$A/cm$^2$, Vcutoff=0.70; 4. 1$^{st}$ discharge: id=50$\mu$A/cm$^2$, Vcutoff=0.84, 5$^{th}$ discharge: id=200$\mu$A/cm$^2$, Vcutoff=0.82; 5. 1$^{st}$ discharge: id=200$\mu$A/cm $^2$, Vcutoff=0.84, 5$^{th}$ discharge: id=200$\mu$A/cm$^2$, Vcutoff=0.77.

Table 1 and FIG. 2 show that the capacity of the SEI formation and $Vs_{SEI}$ depend strongly on. the discharge current density. The SEI formation conditions must be optimized for each cathode chemistry and composition and for each electrolyte composition. The best results were achieved when the SEI was built during several (two or three) charge-discharge cycles. This cathode coating resulted in a ten-fold reduction in the capacity-fading rate, i.e. from about 2% to 0.11% per cycle, therefore imparting an improved cycle life to the Li/CPE/FeS$_2$ cell. A thin-cathode cell went through over 400 cycles (100% DOD) (FIG. 3). In addition, the appearance of the low voltage 1.3 V step on the discharge curves was shifted to later cycles (Table 1), thus leading to an increase in the energy density of the battery.

The overpotential during charge of Li/composite polymer electrolyte/FeS$_2$ battery was found to be larger than that on discharge. Several steps were taken in an attempt to improve the charge process and the cycle life: a) pyrolysis of pyrite; b) doping the cathode with different elements, such as: Co, Fe, Zn and Li$_2$S$_6$; c) combination of (a) and (b). Good results have been obtained using method (a), i.e. pyrolysis of the pyrite, since it induced to a 100 mV decrease in the charge overpotential.

One of the disadvantages of present lithium batteries is a low charging rate. According to the present invention, the charge rate was accelerated by changing the charge procedure. The operating conditions are presented in Table 2:

TABLE 2

| Charge procedure | Charge current density (mA) | voltage range (V) | Duration of constant voltage (2.25 V) Step (hours) | number of cycles | capacity loss, per cycle (%) |
|---|---|---|---|---|---|
| Old procedure (constant current) | 0.05 | 1.6–2.25 | 0 | 102 | 0.62 |
| Improved procedure | 0.5 | 1.6–1.9 | | 101 | 0.28 |
| | 0.25 | 1.9–2.25 | 6 | | |

Table 2 shows that even, with a five to ten-fold increase of the charge current density, the cathode degradation rate was improved considerably.

From the experimental data obtained it may be concluded that the formation of a protective film on the surface of a cathode, brings about to a low capacity fading and may lead to an improved shelf life. In addition it provides improved protection to a lithium battery during wide temperature range operations.

In general, the cathode protective film can be formed by solvent casting, vacuum deposition and preferably, according to the present invention, by an electrochemical method, after the cell has been assembled and filled with electrolyte. For cathodes that are immune to overdischarge, the preferred way is to overdiscbharge the cell to potentials at which the electrolyte is being reduced and the SEI is formed on the surface of the cathode.

The following examples are not to be construed as limiting the invention as described herein.

EXAMPLE 1

A secondary electrochemical cell, consisting of a lithium anode, composite polymer electrolyte and composite cathode was assembled.

A 50 µm thick film composite cathode with a composition of (v/v) 50% FeS$_2$ and 50% composite polymer electrolyte was prepared from 23 mg LiI, 151 mg P(EO), 28.7 mg EC and 705.6 mg FeS$_2$.

A 100 µm thick film composite polymer electrolyte with a composition of LiI$_1$ P(EO)$_{20}$ EC$_1$ 9% v/v Al$_2$O$_3$ was prepared from 93 mg LiI, 611 mg P(EO), 61 mg EC and 201 mg Al$_2$O$_3$.

Poly(etbylene oxide)(P(EO)) was purchased from Aldrich, (average molecular weight 5×10$^6$) and was vacuum dried at 45 to 50° C. for about 24 hours. The LiI (Aldrich) was vacuum dried at 200 to 230° C. for about 24 hours. All subsequent handling of these materials took place under an argon atmosphere in a VAC glove box with an water content <10 ppm.

A polymer slurry was prepared by dispersing known quantities of P(EO), LiI, and ethylene carbonate (EC) in analytical grade acetonitrile, together with the required amount of an inorganic filler, such as Al$_2$O$_3$ (Buehler) with an average diameter of about 150 A, or SiO$_2$. A pyrite based cathode foil was prepared in an argon filled glow box by dispersing FeS$_2$ particles in this polymer slurry. To ensure the formation of a homogeneous suspension, an ultrasonic bath or high-speed homogenizer was used. The suspension was stirred for about 24 hours before the composite cathode films were cast on the fine polished Teflon support (64 cm$^2$ area). The solvent was allowed to evaporate slowly and then the films were vacuum. dried at 120° C. for at least 5 hours. The final thickness of the solvent-free cathode films was between 45 to 50 µm and the composite polymer electrolyte films, which were prepared in a simlar manner, were 90 to 100 µm thick.

Figure 4A:
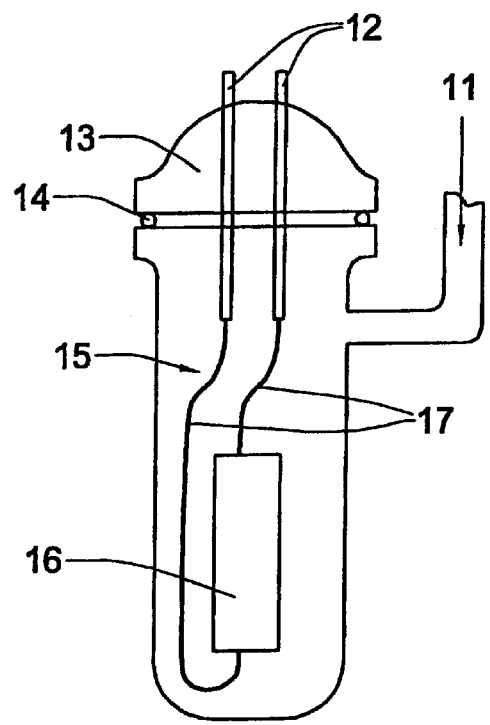
FIG. 4 shows schematically an electrochemical cell.
Figure 4B:
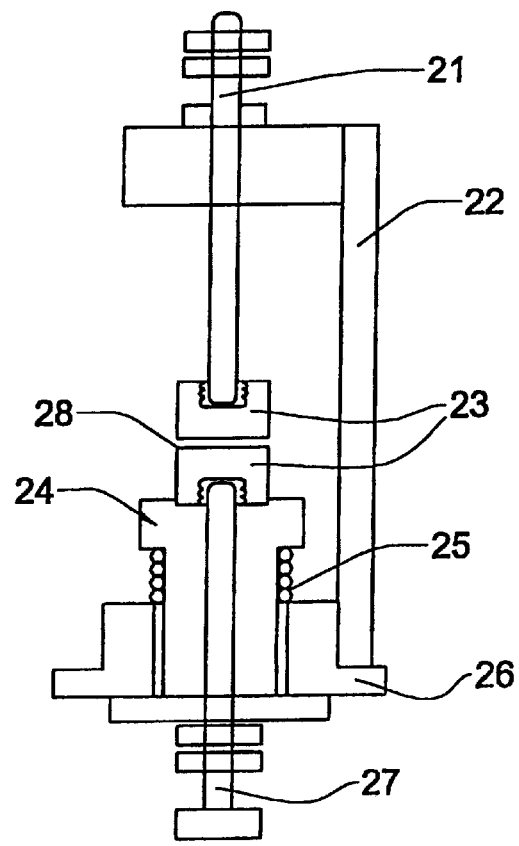

The electrochemical characteristics of the cathodes have been examined in the experimental cell showed in FIG. 4a, which comprises a hermetically sealed glass container 15, provided with an outlet 11, connected to a vacuum pump, 13 is the glass cover of the said vessel, and equipped with a viton O-ring 14. The test cell illustrated in FIG. 4a is connected by wires 17 to tungsten rods 12 which pass through the cover. In the glass container there is positioned the internal test cell 16 which is illustrated in FIG. 4b. This setup for cycling tests comprises a stainless steel (s.s) holder 22, through which there passes stainless steel screws 21 and 27, held by ceramic (Macor) holders 24, 26. The stainless steel electrodes 23 are pressed together by a spring 25. A 1 cm$^2$ composite polymer electrolyte film was inserted between a lithium anode and a pyrite composite cathode (the whole sandwich being marked 28) and was mounted under a spring pressure of 2 to 8 kg/cm$^2$. The current collector for the cathode was 2 mm thick carbon or graphite disk.

The batteries were cycled at 135° C. using a Maccor series 2000 battery test system.

In order to create an ion-conductive protecting layer on the cathode, the voltage cutoff on discharge was 0.3 V vs. lithium. The operating discharge current density was as follows: 300 $\mu$A/cm$^2$ to 1.1 V. The SEI was formed at 500 $\mu$A/cm$^2$ down to 0.3 V. The cell was charged at 50 $\mu$A/cm$^2$ up to 2.25 V.

Figure 5:
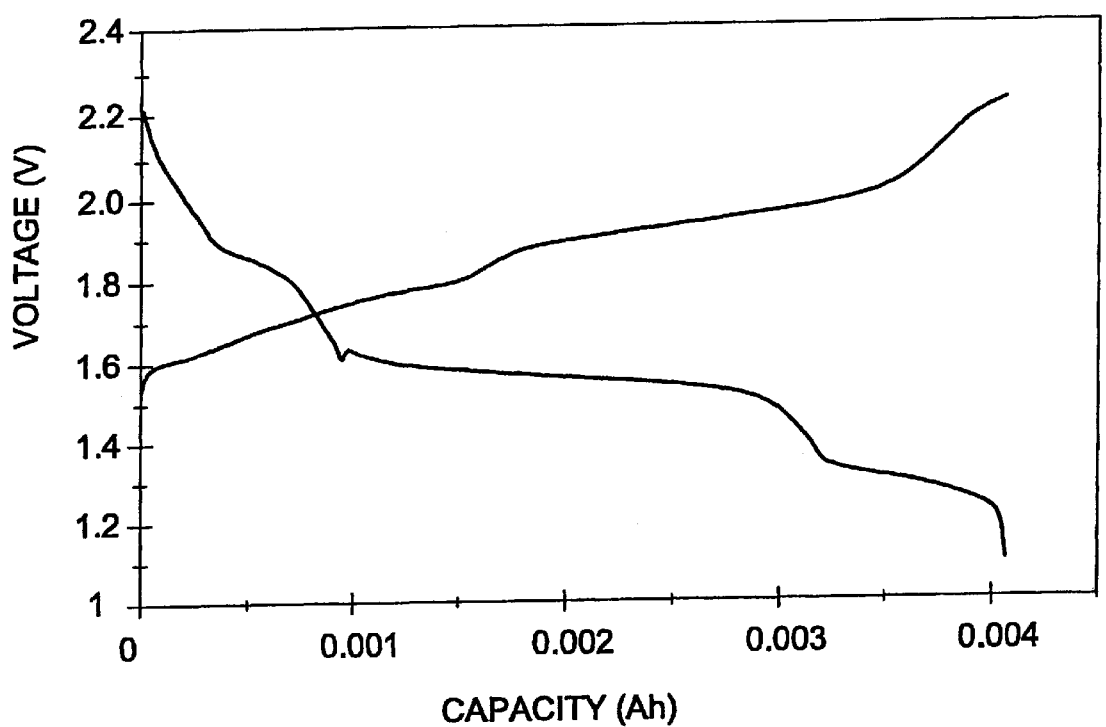
FIG. 5 is a graph showing charge-discharge curves of a Li/CPF/$FeS_2$ cell at cycle 7.

The Li/CPE/FeS$_2$ cell delivered above 4 mAh per cycle (FIG. 5) for over 20 reversible cycles with the capacity fade of 0.37%/cycle. The Faradaic efficiency was close to 100%.

EXAMPLE 2

A Li/CPE/FeS$_2$ cell with a 7 $\mu$m thick film composite cathode was prepared and assembled as described in Example 1, starting with the following starting materials: 3.3 mg LiI, 21.6 mg P(EO), 4.1 mg EC and 100.8 mg FeS$_2$. For the preparation of ultra tin cathodes, 7 $\mu$m pristine pyrite powder was used. This powder was prepared by ball milling the pristine pyrite for 48 hours. In order to prepare a cathode with good mechanical properties and having a good contact with the polymer electrolyte, the polymer electrolyte was casted directly onto the composite cathode film. The resultant two-layered film was placed between the Li anode and the graphite current collector. The SEI was built twice during the first and fifth cycles at 200 $\mu$A/cm$^2$ down to 0.8 V. The total SEI formation capacity was 1.5 mAh. The cell went through over 420 reversible cycles (100% DOD), and the degree of degradation did not exceed 0.11%/cycle. (FIG. 3).

EXAMPLE 3

A Li/CPE/FeS$_2$ cell with a 7 $\mu$m thick film composite cathode was prepared and assembled as described in Example 2. The SEI was built during the first discharge at 50 $\mu$A/cm$^2$ down to 0.76 V. The SEI formation capacity was 1.76 mAh/cm$^2$. The cell went through over reversible 290 cycles (100% DOD), with the degree of degradation being 0.19%/cycle. (FIG. 3)

EXAMPLE 4

A Li/CPE/FeS$_2$ cell with a 7 $\mu$m thick film composite cathode was prepared as described in Example 2. The SEI was formed twice, during the first discharge at 50 $\mu$A/cm$^2$ and the fifth discharge at 200 $\mu$A/cm$^2$ down to 0.815 V. The SEI formation capacities were 1 and 0.5 mAh/cm$^2$, respectively. The cell went through over 235 reversible cycles (100% DOD), and the degree of degradation did not exceed 0.16%/cycle (Table 1, FIG. 3)

EXAMPLE 5

A Li/CPE/FeS$_2$ cell with a 7 $\mu$m thick film composite cathode with a Li$_2$S$_6$ to LiI ratio=1:0.25 was assembled as described in Example 2. The Li/CPE/FeS$_2$ cell was cycled for over 17 (100% DOD) cycles.

EXAMPLE 6

A lithium-pyrite cell with a 50 $\mu$m thick film composite cathode, containing 35% of FeS$_2$ and polymer electrolyte was prepared according to the procedure of Example 1. The SEI was formed at 200 $\mu$A/cm$^2$ down to 0.8 V. The battery was reversibly charged-discharged for 36 cycles and delivered 2.8 mAh per cycle. The Faradaic efficiency was close to 100%.

EXAMPLE 7

A lithium-pyrite cell with a 7 $\mu$m-thick film composite cathode was prepared according to Fxample 2. The SEI was formed during first discharge at 500 $\mu$A/cm$^2$ down to 0.1 V. The charge current density during cell cycling was changed as follows: 500 $\mu$A/cm$^2$ up to 1.9 V and 250 $\mu$A/cm$^2$ up to 2.25 V. The charge process was continued under a constant voltage of 2.25 V during 6 hours. This threestep charge procedure allowed to reduce the charge time to less than 8 hours, as compared to at least 40 hours of typical charge time. The battery was reversibly cycled at over than 100 (100% DOD) cycles. Even with a five to ten-fold increase of the charge current density (in the first step), the cathode degradation rate did not change markedly and did not exceed 0.28% /cycle(FIG. 3)

EXAMPLE 8

A cell with a 7 $\mu$m trick film composite cathode having the following composition (v/v): 60% pyrite, 32% PVDF, 3% v/v LiI and 5% graphite Osbory, was prepared as described in Example 2. CPE contained, LiI$_1$ P(EO)$_{16}$ P(MMA)$_{0.8}$—0.8, EC$_1$ and 12% v/v Al$_2$O$_3$. The SEI was created during the 8th cycle at 50 $\mu$Ah/cm$^2$ down to 0.6 V. The battery showed 20 stable reversible cycles.

EXAMPLE 9

An electrochemical cell with a 25 $\mu$m thick film cathode, composed of (v/v) 18% pyrite, 81% styrene and 1% graphite Osbory was prepared as described in Example 2. The electrolyte contained, LiI$_1$ P(EO)$_9$ P(MMA)$_{0.5}$ EC$_1$ and 12% v/v Al$_2$O$_3$. The SEI was formed at 50 $\mu$Ah/cm$^2$ down to 0.6 V. The cell was reversibly cycled for 60 cycles with 0.3% capacity fade.

EXAMPLE 10

An electrochemical cell with a 10 $\mu$m thick film cathode, composed of (v/v) 42% pyrite, 52% polycarbonate resin, 3% LiI and 3% graphite Osbory, was prepared as described in Example 2. The electrolyte composition was as in Example 9. The formation of SEI was performed at the 15-th cycle at 50 $\mu$Ah/cm$^2$ down to 0.8 V The cell was cycled for 24 reversible cycles.

EXAMPLE 11

The cell of Example 8 was prepared, with the exception that the cathode contained (v/v) 69% polybutadiene as a binder. The SEI was formed twice at 50 $\mu$Ah/cm$^2$ down to 0.8 V. The cell was cycled for over than 120 reversible cycles with a capacity loss of 0.4%/cycle.

EXAMPLE 12

A cell with a 7 $\mu$m thick pyrite-based (35% v/v) cathode was prepared according to Example 4. The polymer electrolyte had the following composition: LiI$_{0.9}$ LiBr$_{0.1}$ P(EO)$_9$ P(MMA)$_{0.5}$ EC$_1$ 12% v/v Al$_2$O$_3$. The SEI was formed during the first discharge at 50 $\mu$Ah/cm$^2$ down to 0.8 V The battery delivered 0.6 mAh per cycle for 30 reversible cycles.

EXAMPLE 13

A cell with a 7 $\mu$m thick pyrite-based (50% v/v) cathode was prepared according to Example 2. The polymer electrolyte had the following composition: $(CF_3SO_3)_2NLi$ $P(EO)_{16}$ $P(MMA)_{0.8}$ $EC_1$ 12% v/v $Al_2O_3$. The SEI was created during the first discharge at 50 μAh/cm² down to 0.8 V The battery delivered 1.0 mAh per cycle for 27 cycles.

EXAMPLE 14

Figure 6:
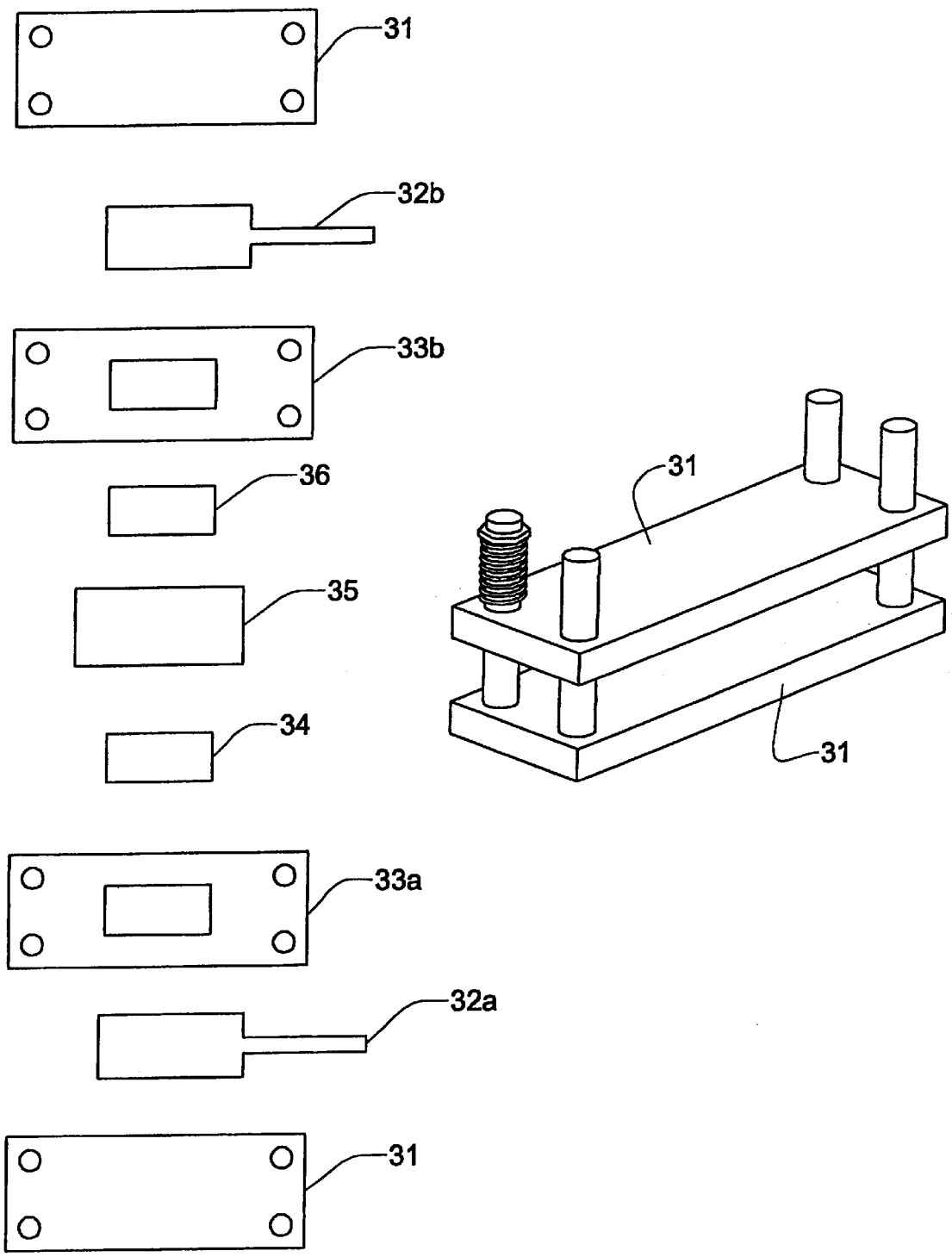
FIG. 6 shows a setup for cycling tests.

A lithium /polymer electrolyte/pyrite cell was prepared according to the procedure described in the Example 2, with a 10 μm.- thick 10 cm² area composite cathode. The setup for cycling tests (FIG. 6) comprises two 6 mm thick aluminum plates 31, through which there passes 4 screws with springs. A 10 cm² pyrite composite cathode 36, a polymer electrolyte film 35 and a lithium anode 34 were mounted between two separators 33a and 33b, under a spring pressure of 3 kg/cm². The cathode current collectors 32a and 32b were 200 μm-thick graphite foils. Charge-discharge curves and the performance characteristics of the 10 cm²-area cells were similar to those of the small laboratory prototype cells.

Figure 7:
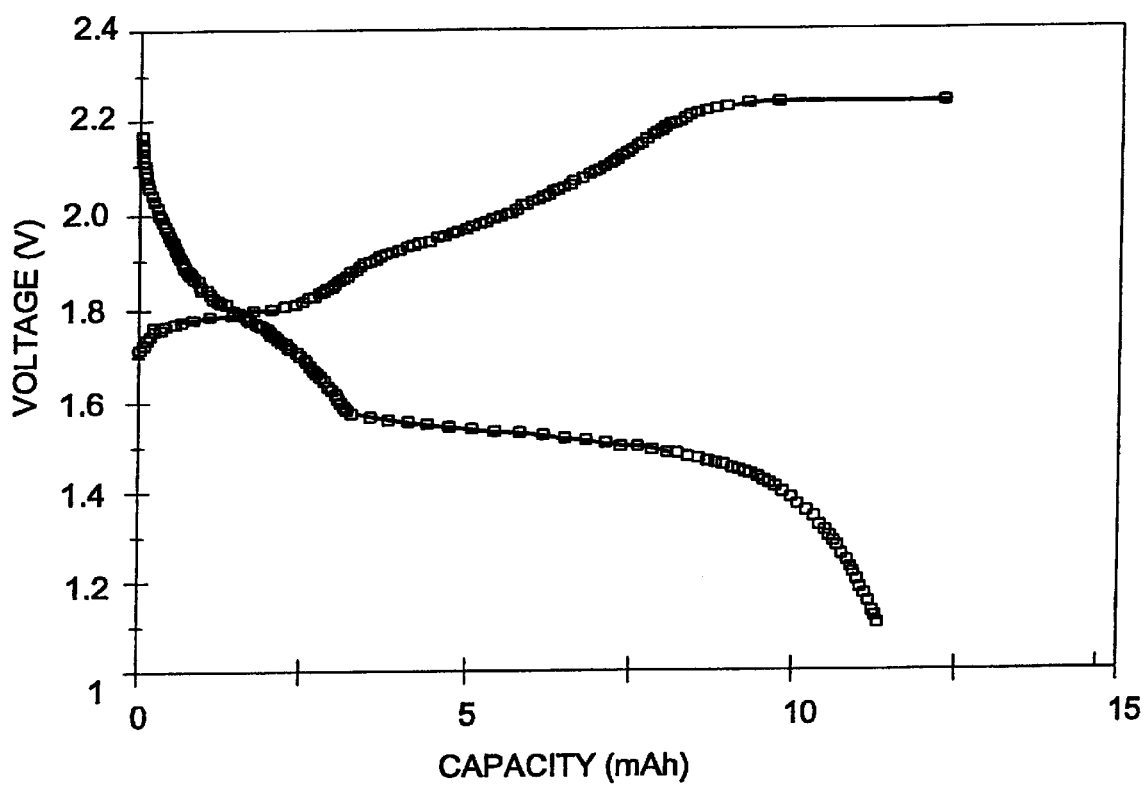
FIG. 7 is a graph showing charge-discharge curves of a 10 cm$^2$ area Li/CPE/$FeS_2$ cell at cycle 3.

The cell was reversibly charged-discharged over 30 cycles, and derived about 8 mAh per cycle (FIG. 7). The capacity fade did not exceed 0.7%/cycle.

EXAMPLE 14a (Comparative Example)

A Li/CPE/FeS₂ cell with a 10 μm thick cathode was assembled as described in Example 14. Stainless steel or aluminium, foil were used as a cathode current collector. It was found that charge/discharge characteristics of the cells with Al and stainless steel current collectors are inferior to graphite. The overpotential of charge/discharge is generally higher and the degradation rate is about 2 times larger.

EXAMPLE 15

A Li/CPE/FeS₂ cell with a 10 μm thick cathode was assembled as described in Example 14. The nickel current collector was coated with about 5 μm-thick carbon layer by chemical vapor deposition method (CVD), using a gas mixture containing (v/v) 15% ethanal and 85% argon, at 1000° C. The cell demonstrated over 20 reversible cycles.

EXAMPLE 16

Figure 8:
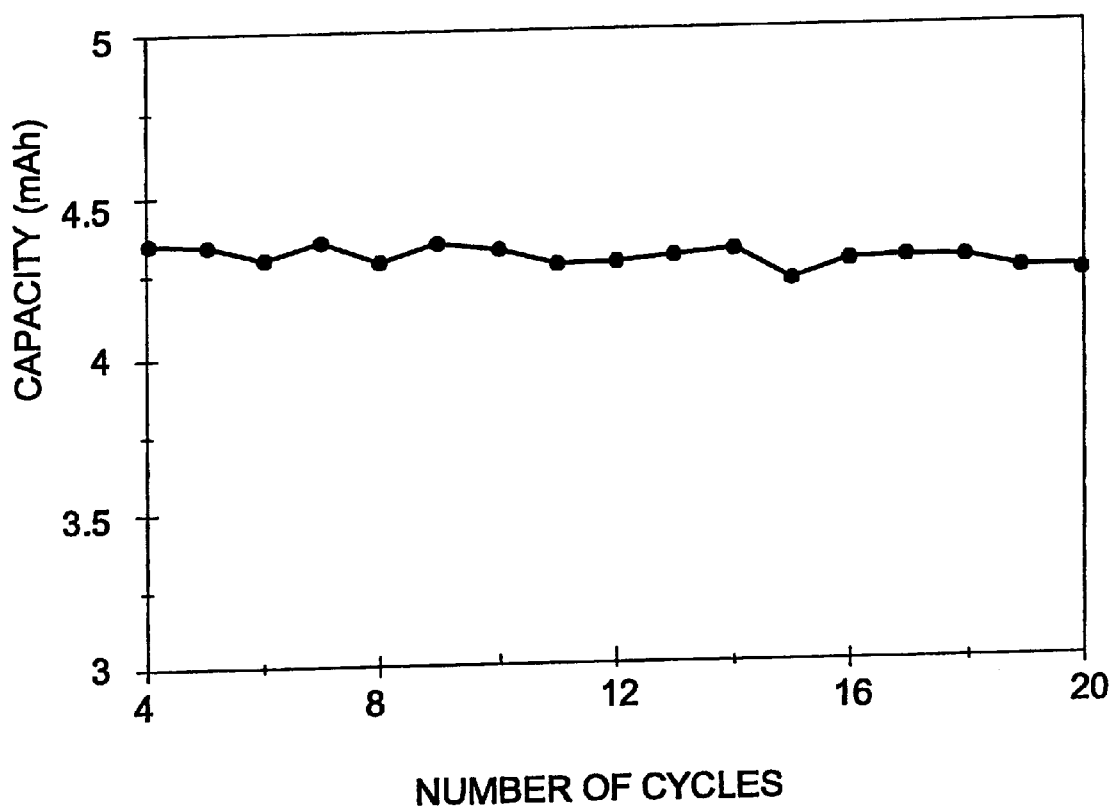
FIG. 8 is a graph showing the capacity fading of a Li/LiAsF$_6$,EC:DMC/LiCoO$_2$ cell.

A lithium /non-aqueous electrolyte/cobalt oxide cell with a 50 μm thick film composite cathode, containing (v/v): 90% $LiCoO_2$, 5% Teflon and 5% graphite R-LIBA-D. Electrolyte composition: 1 M $LiAsF_6$ and ethylene carbonate (EC) :dimethyl carbonate (DMC) 1:2. The cell was reversibly charged-discharged at room temperature. The protective SEI film was built twice at 1 mA/cm² during cycles 1 and 3. The voltage cutoff of the SEI formation was 0.1 V. During subsequent 20 cycles the cell demonstrated extremely stable capacity. The degree of degradation did not exceed 0.005% per cycle (FIG. 8).

EXAMPLE 17

Figure 9:
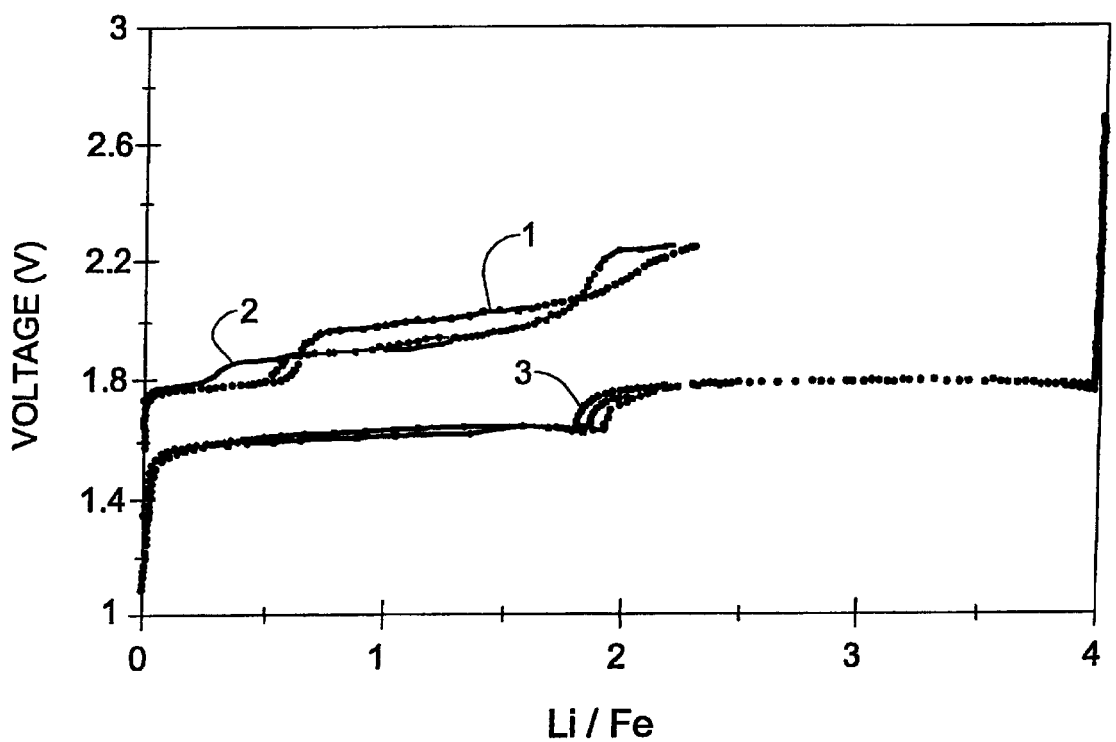
FIG. 9 is a graph showing the influence of pyrite preparation on charge-discharge curves of Li/CPE/$FeS_2$ cells 1. Pristione pyrite. 2. Heat treated pyrite at 425 C. for 1 hour. 3. Heat treated pyrite at 450 C. for 3 hours.

A rechargeable lithium cell with a 7 μm-thick composite cathode was assembled as described in Example 2. In order to improve the charge process the pyrite powder was put through a special pyrolysis process at 425° C. for 1 hour, prior to the cathode preparation. The Li/CPE/FeS₂ cell was cycled at 1.1 to 2.25 V for over 40 (100% DOD) cycles. The charge overvoltage was about 100 mV smaller than that of the pristine pyrite(FIG. 9).

EXAMPLE 18

A secondary electrochemical Li/CPE/FeS₂ cell with optimized 15 μm-thick pyrite composite cathode was assembled.

The composite cathode contained: 40% (v/v) pyate and 60% (v/v) of $LiI_1$ $P(EO)_{20}$ $EC_1$ 40% v/v composite polymer electrolyte. The Li/CPF/FeS₂ cell was cycled at 135° C., voltage range:1.1 to 2.25 V and current density: 0.3 to 5 mA/cm² for over 20 (100% DOD) cycles. The cycling test results are presented in Table 3.

TABLE 3

| Discharge current density, (mA/cm²) | Discharge capacity, (mAh) |
|---|---|
| 0.3 | 1.74 |
| 1.0 | 1.45 |
| 2.0 | 1.1 |
| 3.0 | 1.18 |
| 4.0 | 0.84 |
| 5.0 | 0.6 |

A reversible Li/Fe ratio of about 2.3 (at C/1.5 rate) was obtained for an optimied 12 μm-thick pyrite composite cathode. The anticipated specific energy of the cell employing this cathode is 130 Wh/kg (at C/1.5 rate) and its projected continuous specific power is about 300 W/kg based on 5 mA/cm² discharge tests.

EXAMPLE 19

A secondary electrochemical Li/CPE/FeS₂ cell as in Example 18 was assembled. The cell was subjected to high current density pulses. The experimental data are presented in Table 4.

TABLE 4

| Discharge current density (mA/cm²) | Pulse time (sec) |
|---|---|
| 25 | 2 |
| 50 | 0.32 |
| 100 | 0.06 |

This thin-cathode cell is capable of delivering 0.1 A/cm² pulses that are equivalent to a specific power of 3 kW/kg for a complete battery.

What is claimed is:

1. A cathode for use in a secondary electrochemical cell, comprising up to about 95 volume-% of electrochemically active material, characterized in that the cathode is coated, after being assembled, by a thin, ion-permeable, electronically non-conductive protective film of a thickness of up to about 0.1 μm.

2. A cathode according to claim 1, wherein the protective film is formed electrochemically by over-discharge of said electrochemical cell.

3. A cathode according to claim 2, wherein the protective film is formed electrochemically at the end of the discharge under a discharge current density of between about 0.01 to about 5 mA/cm² and a voltage of between about 0.1 to about 2.5V.

4. A cathode according to claim 3, wherein said protective film is formed during a plurality of charge-discharge cycles.

5. A cathode according to claim 1, wherein said electrochemically active material is selected from $LiCoO_2$, $LiNiO_2$, $LiMn_2O_4$, $FeS_2$, $FeS_2$, $TiS_2$, $V_2O_5$ and $V_8O_{13}$, which is optionally doped with up to about 10% w/w of a metal selected from Mg, Ca, Ni, Co, Al, B, Fe, Mn, or a compound of such metal.

6. A cathode according to claim 1, which further contains up to 15% resin binders selected from: polyvinilidene fluoride, polybutadiene, polystyrene, polycarbonate, polyethylene oxide, and polyacrylonitrile.

7. A cathode according to claim 1, which further contains up to 20% of an inorganic filler having particles size of up to about 150 nm, said filler being selected from $Al_2O_3$, $SiO_2$, MgO, $TiO_2$, $ZrO_2$ or mixtures thereof.

8. A secondary electrochemical cell comprising a cathode according to claim 1.

9. A secondary electrochemical cell according to claim 8, comprising an anode made of an alkali metal (M), alkali metal alloy or of $M_xC_6$, x being a number between 0.5 to 2; a non-aqueous or polymer electrolyte which contains materials that upon electroreduction form alkali metal salts or oxides; and current collectors.

10. A cell according to claim 9, wherein the cathode current collector is made of aluminum, nickel or stainless steel coated with carbon or graphite.

11. A cell according to claim 9 wherein the anode is preferably made of lithium, lithium alloy or $Li_xC_6$, x being a number between 0.5 to 2.

12. A cell according to claim 9, wherein said electrolyte comprises a salt selected from the group consisting of $LiPF_6$, $LiAsF_6$, $LiBF_4$, $LiCF_3SO_3$, $LiN(CF_3SO_2)_2$, LiI, LiBr, and mixtures thereof.

13. A cell according to claim 12, wherein the electrolyte further comprises one or more of alryl carbonate, dialkyl sulfites, a polymer electrolyte or a composite polymer electrolyte, and an inorganic filler.

14. A cell according to claim 13, wherein said alkyl carbonates are selected from the group consisting of ethylene carbonate, dimethyl carbonate, diethyl carbonate, ethyl methyl carbonate, butyl carbonate, propylene carbonate and vinyl carbonate.

15. A cell according to claim 8, wherein the cathode active material is pyrite, the volume fraction of the alkyl carbonate is less than 15% and the pyrite volume fraction is between about 30% to about 70%.

16. A cell according to claim 15, wherein the composite polymer electrolyte comprises one or more of a high molecular weight polyethyleneoxide, a salt and up to 20% by volume of inorganic filler having particles size of up to about 150 nm and a solvent.

17. A cell according to claim 16, wherein the salt is selected from $LiCF_3SO_3$, $LiN(CF_3SO_2)_2$, LiI, and mixture thereof.

18. A cell according to claim 16, wherein the filler is one or more of the group consisting of $Al_2O_3$, $SiO_2$, MgO, $TiO_2$ and $ZrO_2$.

19. A cell according to claim 16, wherein the electrolyte solvent is polyethylene glycol dimethyl ether with a molecular weight of between about 300 and about 2000.

20. A cell according to claim 15, wherein the pyrite powder is optionally subjected to a pyrolysis process prior to preparing the cathode.

21. A multicell battery according to claim 8.

* * * * *